(12) United States Patent
Filner et al.

(10) Patent No.: US 7,362,311 B2
(45) Date of Patent: Apr. 22, 2008

(54) SINGLE COLUMN LAYOUT FOR CONTENT PAGES

(75) Inventors: Aaron Filner, Seattle, WA (US); Jay McLain, Woodinville, WA (US); Andrew Dadi, West Palm Beach, FL (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/787,885

(22) Filed: Feb. 25, 2004

(65) Prior Publication Data

US 2004/0255244 A1 Dec. 16, 2004

Related U.S. Application Data

(60) Provisional application No. 60/461,323, filed on Apr. 7, 2003.

(51) Int. Cl.
*G09G 5/00* (2006.01)

(52) U.S. Cl. ........................................ 345/169; 345/204

(58) Field of Classification Search ................ 345/204, 345/690–695, 214, 156–173; 715/513, 517, 715/518, 519, 788
See application file for complete search history.

(56) References Cited

U.S. PATENT DOCUMENTS

| | | | | |
|---|---|---|---|---|
| 5,060,170 A * | 10/1991 | Bourgeois et al. | ......... | 715/788 |
| 5,281,146 A * | 1/1994 | Janney | ......... | 434/348 |
| 5,923,323 A * | 7/1999 | Chiu et al. | ......... | 715/767 |
| 6,411,302 B1 * | 6/2002 | Chiraz | ......... | 345/545 |
| 6,727,875 B1 * | 4/2004 | Mikami et al. | ......... | 345/92 |
| 6,827,273 B2 * | 12/2004 | Wilz et al. | ......... | 235/472.01 |
| 6,961,898 B2 * | 11/2005 | Bennett | ......... | 715/503 |
| 7,082,576 B2 * | 7/2006 | Shahine et al. | ......... | 715/789 |
| 2004/0070627 A1 * | 4/2004 | Shahine et al. | ......... | 345/794 |
| 2005/0236483 A1 * | 10/2005 | Wilz et al. | ......... | 235/462.01 |

\* cited by examiner

*Primary Examiner*—Nitin I. Patel
(74) *Attorney, Agent, or Firm*—Workman Nydegger (57) ABSTRACT

A system and method for small computing devices that present a single column of content such as a web page such that a user need only scroll vertically to see the content. A parser converts HTML to CSS as necessary, and a single column style sheet modifies content for a more-optimized viewing experience. To this end, tables and tables cells are rendered as blocks, with no padding/border/margins and any explicit widths and heights changed to automatic. Other table elements are rendered as block level elements, and horizontal margins are eliminated or re-enabled on some elements in a reduced manner. Spacer images are removed, as well as cell background images and small images. Content such as text is wrapped, and images are resized as necessary based on the screen display width. The result is a single content column that facilitates viewing and scrolling in only one direction.

33 Claims, 13 Drawing Sheets

↓ from FIG. 3B

Buy New Music
Find a Home Loan Now
Free Credit Report
Get a FREE Phone
Nordstrom Ships Free
Save on Vacations
Spring Gifts
Used Car Deals
More...
Fun
Calling All Critics
Cartoons
Downloads
Event Tickets
Games
Go Mobile
Greeting Cards
Hear Music
Horoscopes
Lottery Results
Movie Times
Photos
Sports Scores
TV Listings
More...

Bush gives ultimatum
Saddam, sons warned to leave --

↓ from FIG. 3D own nose

ESPN Sports
- An NBA star's bush-league play
- Grant Hill needs ankle realignment
- No surprise: UCLA fires Lavin

CNBC on MSN Money more...

Find a Broker
Ameritrade | Harrisdirect | Trade Now | ShareBuilder | TD Waterhouse

Name

Last
Change
% Chg

Dow 8,141.92
▲
+282.21
+3.59%

S&P 862.79
▲
+29.52
+3.54%

NASDAQ 1,392.27
▲
+51.94
+3.88%
Update

Quotes by S&P, 20 min. delay

↓ from FIG. 3E

Get quote:

[          ] [Go]

Insurance | Pay Bills | Loans | News | Credit Report | Markets | File Taxes

MSN Shopping more...

What's Hot Right Now

70% off 400 TC sheets
- AVON: Free ship & gift
- Kohl's: Everything on sale
- Get a free Fekkai sample
- Hot ultracompact digicams
- Tony Little Trainer $95
- $1 extra laptop battery
- Save 10-30% JCPenney

Today's Sales & Deals

Need contact lenses? Save up to 70% at VisionDirect.com

MSN Entertainment more...

Gossip: Cameron's Got Munchies

Why her eating disgusts Drew; plus, Cris reveals J.Lo can't control her gas

Fun & Games
- If Tetris is easy,

*from FIG. 3F*

KumbleCube is hard!
- Test your knowledge of world capitals

Entertainment Today
- Hot Oscar video: Leo's big kiss & more
- Russell Crowe's wedding date set

MSN Links & Resources more...

From MSN
Broadband Access
Internet Access Deals
MSN 8 Deals
MSN 8 Software
MSN Alerts Contests
MSN Messenger
MSN on your Cell Phone
Try MSN TV

From Microsoft
Microsoft Products
Office Tools
Pocket PC
Small Business Services
Windows Update
Xbox.com

Other Resources
Advertise on MSN
Contact MSN
Get Help with MSN

Local Resources

ZIP:
[    ] [Go]
Get local news, weather, and regional information for any city

MSN Channels

↓ from FIG. 3H activities, school tools, and news for kids

- ADD MSN Kids to My MSN Page

MSN Worldwide
US - Spanish
Australia
Canada
China
Germany
India
Japan
Korea
Mexico
Singapore
UK
More...

Make this my home page | Back to top

MSN - More Useful Everyday
MSN Home | My MSN | Hotmail | Search | Shopping | Money | People & Chat ©2003 Microsoft Corporation. All rights reserved. Terms of Use Advertise TRUSTe Approved Privacy Statement GetNetWise

SINGLE COLUMN LAYOUT FOR CONTENT PAGES

CROSS-REFERENCE TO RELATED APPLICATION

This application claims the benefit of U.S. Provisional Application Ser. No. 60/461,323 filed Apr. 7, 2003, entitled SINGLE COLUMN CONTENT LAYOUT FOR WEB PAGES, incorporated herein in its entirety.

FIELD OF THE INVENTION

The invention relates generally to displaying content such as web pages, particularly on mobile computing devices including computers and mobile telephones.

BACKGROUND

Mobile computing devices such as personal desktop assistants, contemporary mobile telephones, hand-held and pocket-sized computers, tablet personal computers and the like, are becoming important and popular user tools. In general, they have become small enough to be extremely convenient, while consuming less battery power, and at the same time have become capable of running more powerful applications.

Such devices are able to connect to networks, including the Internet. Contemporary mobile devices such as a PocketPC thus may present web pages to users. Likewise, mobile telephones such as those running Microsoft® Smartphone software allow users to make conventional mobile telephone calls and also access the Internet, as well as send and receive e-mails and files, store contacts, maintain appointments and do many other things contemporary computers can now do.

While the network connectivity features of such devices provide a number of benefits, their small screen size leads to a number of problems. For example, one of the fundamental difficulties with web browsing on mobile devices today is presenting web content on the small screen of a mobile device in a way that users can easily use and understand. At the source end, content providers may not know the type of devices that are accessing their site, but even if they did, many would not provide different page layouts based on each type of device. At the receiving end, shrinking the size of an existing website page to fit a small screen makes the page content too small to be easily viewed. As a result, devices with small screens are arranged to show only a portion of the page at a time, and provide horizontal and vertical scrolling mechanisms for the user to move around, which is essentially like shifting the content around behind a small, fixed viewing aperture.

However, requiring the user to scroll in two dimensions to read content is not a very desirable solution. This is because users easily get lost and are otherwise confused as to where they are positioned within a page. Also, lines of text that are wider than the screen become difficult to read, as the user has to scroll to the right to finish reading one line of text, and all the way back left to begin reading the next line. In sum, small devices do not match up well with conventionally-provided web content.

SUMMARY OF THE INVENTION

Briefly, the present invention is directed towards a system and method that rearrange the content of a page of content so that the content of the page appears in a single vertical column. As a result, the user of a device having a small screen can view an entire page of content by scrolling only vertically, eliminating the need to scroll horizontally to view content for most pages. The present invention thus provides the ability to adapt content (e.g., comprising HTML-based content) originally designed for desktop viewing into a form that is usable on the small screen of a mobile computing device.

A number of mechanisms are provided to facilitate the elimination of horizontal scrolling while laying out existing content in a way users can recognize and understand. Such mechanisms include rendering table cells as block elements to ensure one cell appears per line. Another mechanism wraps text content so that the width of a line of text does not exceed the width of the screen. Another mechanism eliminates spacer images and decorative images used for layout purposes that do not contain any relevant content the user needs to see, read, or click. Another mechanism resizes any remaining images to fit to the width of the screen.

When a user requests a page, the page content is internally rearranged so that it can be presented as a single column, thereby enabling presentation of web content on the small screen of a mobile device in a way that users can easily use and understand. To this end, and in general, the initial page's source code (e.g., in HyperText Markup Language (HTML) or Cascading Style Sheets (CSS) format) is modified such that when interpreted for final rendering, the contents of the page are rendered in a single column.

If the received content is HTML, attributes and parts of the HTML that have CSS equivalents are converted to CSS. The conversion may be accomplished by a parser during a parsing phase. In general, the conversion operates by finding a CSS equivalent for each attribute and part of the HTML that has a CSS equivalent. To this end, the parser invokes an appropriate CSS equivalent object from a set of such objects based on the HTML tag, which, based on the HTML attribute or attributes, returns appropriately formatted equivalent CSS.

Once in CSS format, a single column style sheet applies rules to change some of the layout attributes as needed to present the content in a single column, in a way that tends to optimize its presentation. In general, the modified CSS changes multiple columns, table cells, and so forth into content that when rendered will appear as a single stacked column of content. To this end, the single column style sheet first renders only one td per row, which is achieved in CSS by indicating that td is a block level element. This preserves the blocks on the page and thus preserves the context of the block.

In addition, any padding, border or margins are initially removed, and any specified heights and widths are set for automatic scaling. Rows, footers, headers and body content are arranged to be displayed inline. As a result, blocks that would be vertically and horizontally positioned when displayed are instead displayed only vertically.

To further fit the blocks to the display width to accommodate viewing, any exterior left and right margins in the body are set to some lesser number of pixels on either side of the screen. This removes unnecessary space lost to large borders and the like. Other tags within the body are modified to not allow any margins, thereby giving more space horizontally in the block for the meaningful content. Also Blockquote attributes appearing in the CSS content for purposes of horizontal indentation are changed to a lesser number of pixels, thereby allowing some horizontal indentation, but less than would otherwise be present.

Another way in which the single column presentation of the content is enhanced is via content wrapping. For example, text is wrapped to fit within the column, and therefore need not be radically scaled down to fit within the column width. Also, certain images such as transparent spacer images or decorative images that have little utility in the new single column layout are removed. The blocks are also re-scaled as necessary prior to presentation such that the screen shows the entire width of each block in one column.

Other advantages will become apparent from the following detailed description when taken in conjunction with the drawings, in which:

DETAILED DESCRIPTION

Exemplary Operating Environment

Figure 1:
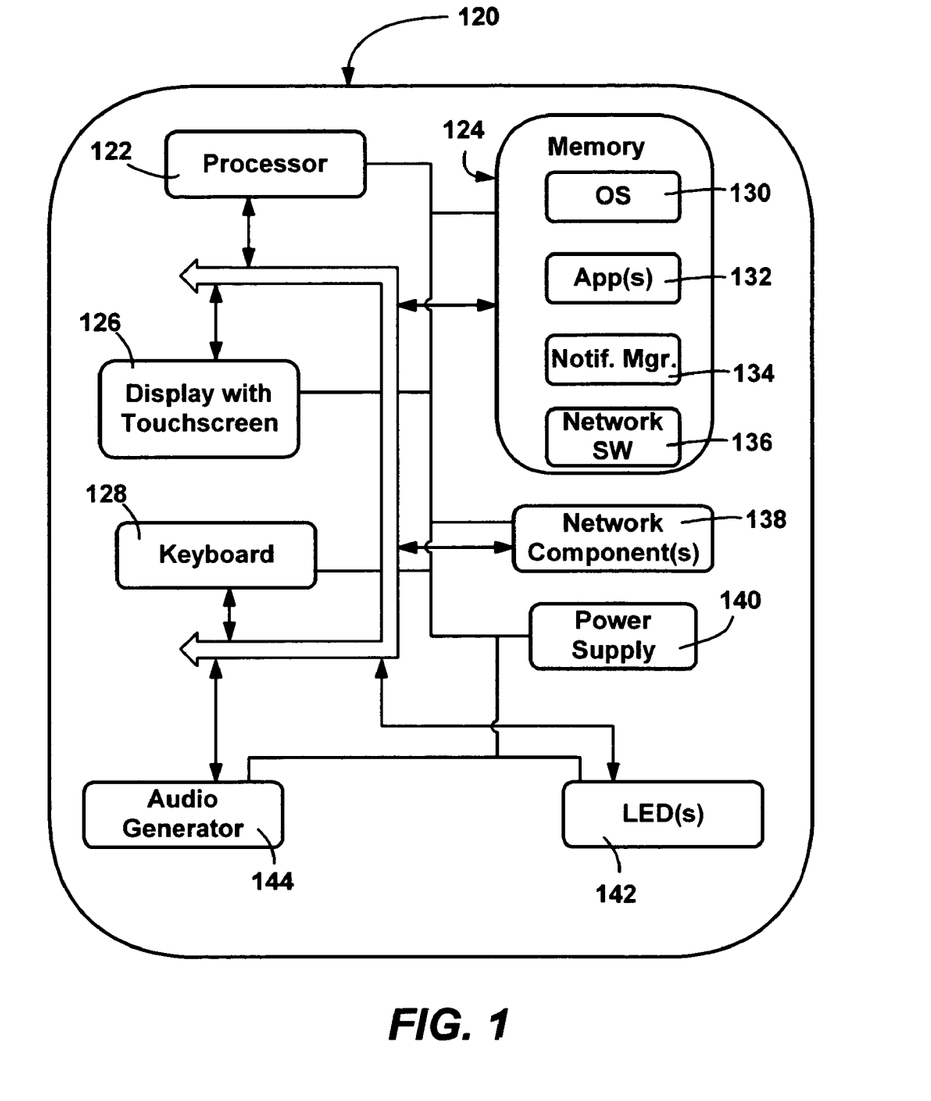
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Single Column Content Layout

The present invention is generally directed towards viewing pages of content, particularly on small display screens such as present on mobile computing devices and/or mobile telephones. As will be understood, however, the present invention is not limited to any type of computing device, and may, for example, be used with a relatively large display, such as to assist visually-impaired users, assist web page designers in arranging content to be viewed on small devices, and so forth. Moreover, the present invention is not limited to viewing only web content, but can also be applied to any structured document, including word processing documents, spreadsheets and so forth. As used herein, the term "content" refers to any document having some structure that can be analyzed and separated into blocks.

Figure 2:
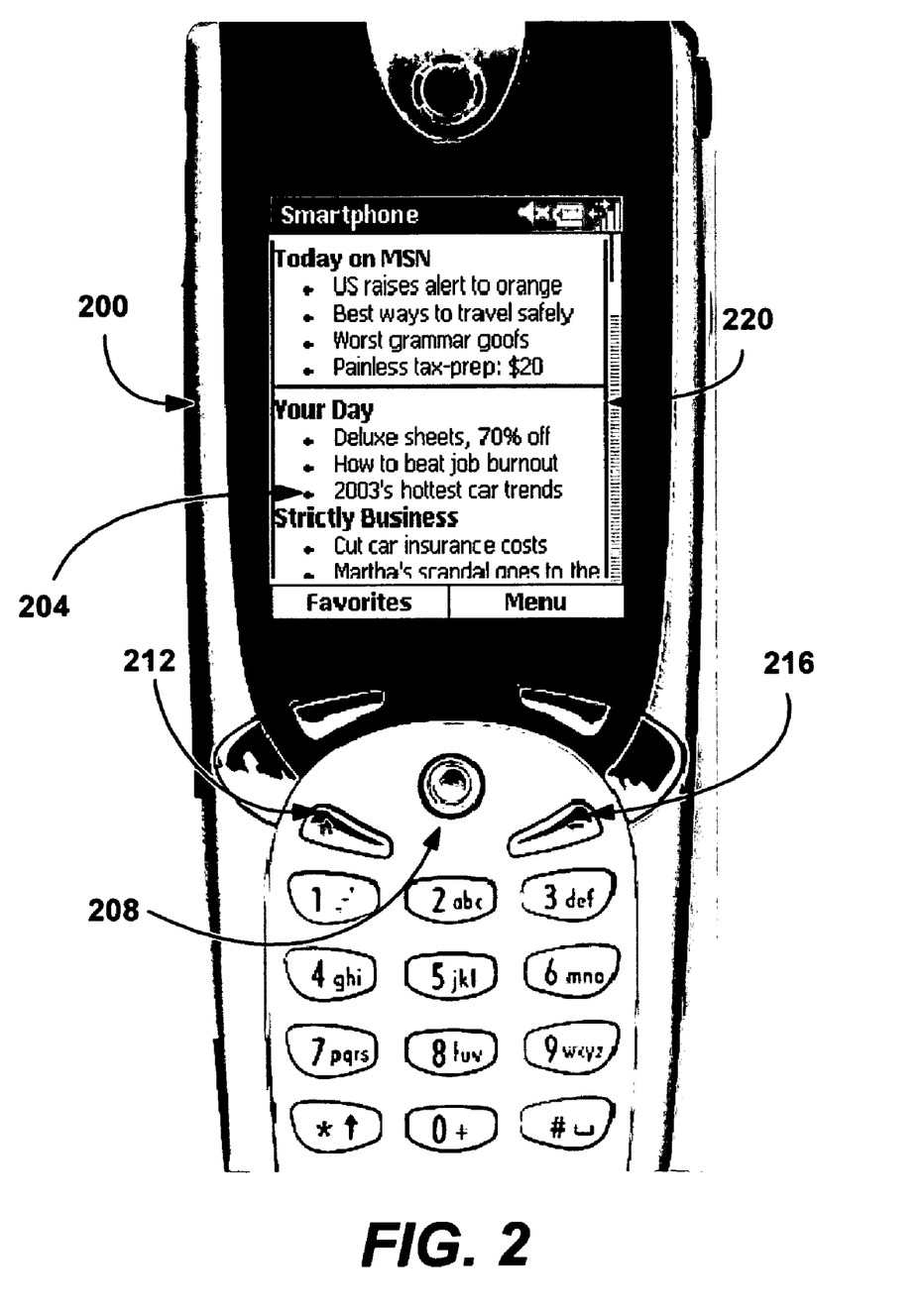
FIG. 2 is a representation of a mobile telephone constructed in accordance with an aspect of the present invention, including a mechanism for displaying content in a single column.
Figure 3A:
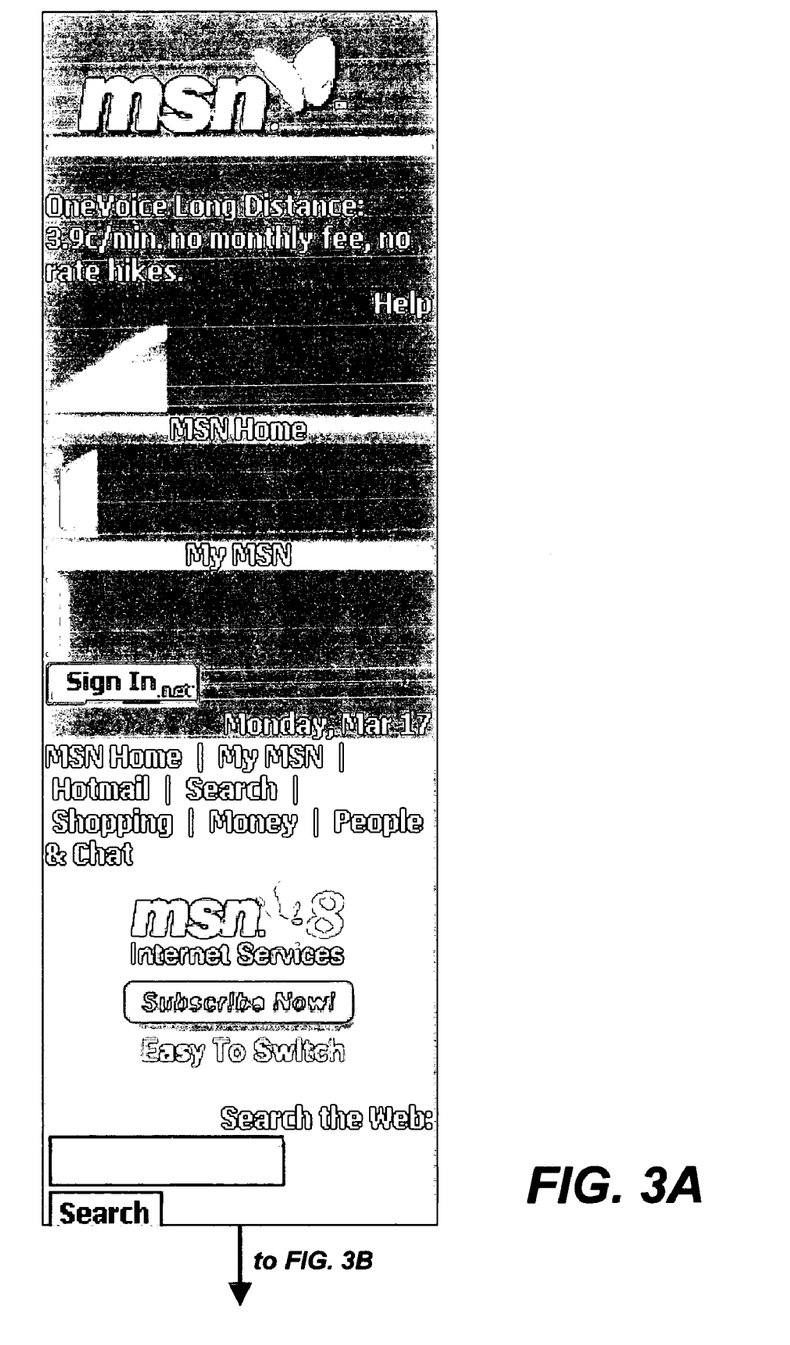
FIGS. 3A-3I comprise a representation of content arranged for display in a single column in accordance with an aspect of the present invention.
Figure 3B:
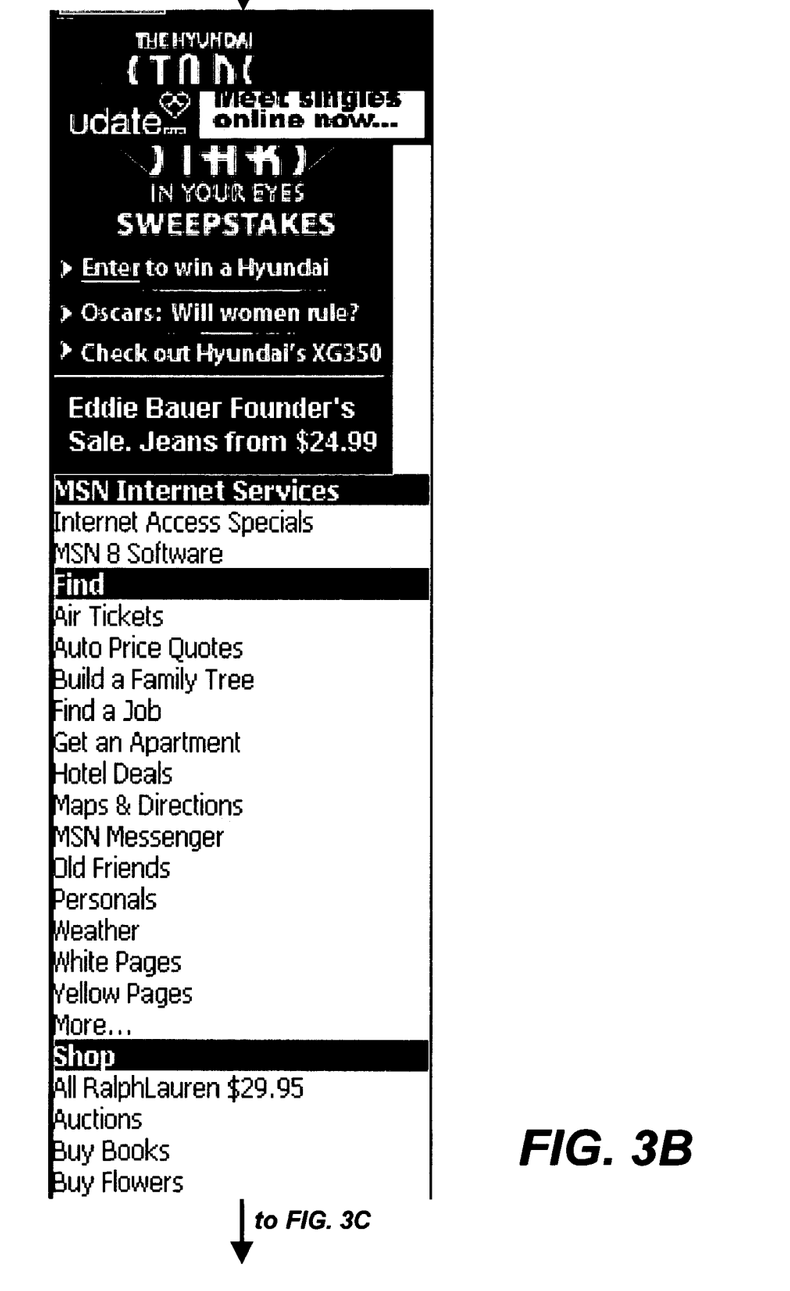
Figure 3C:
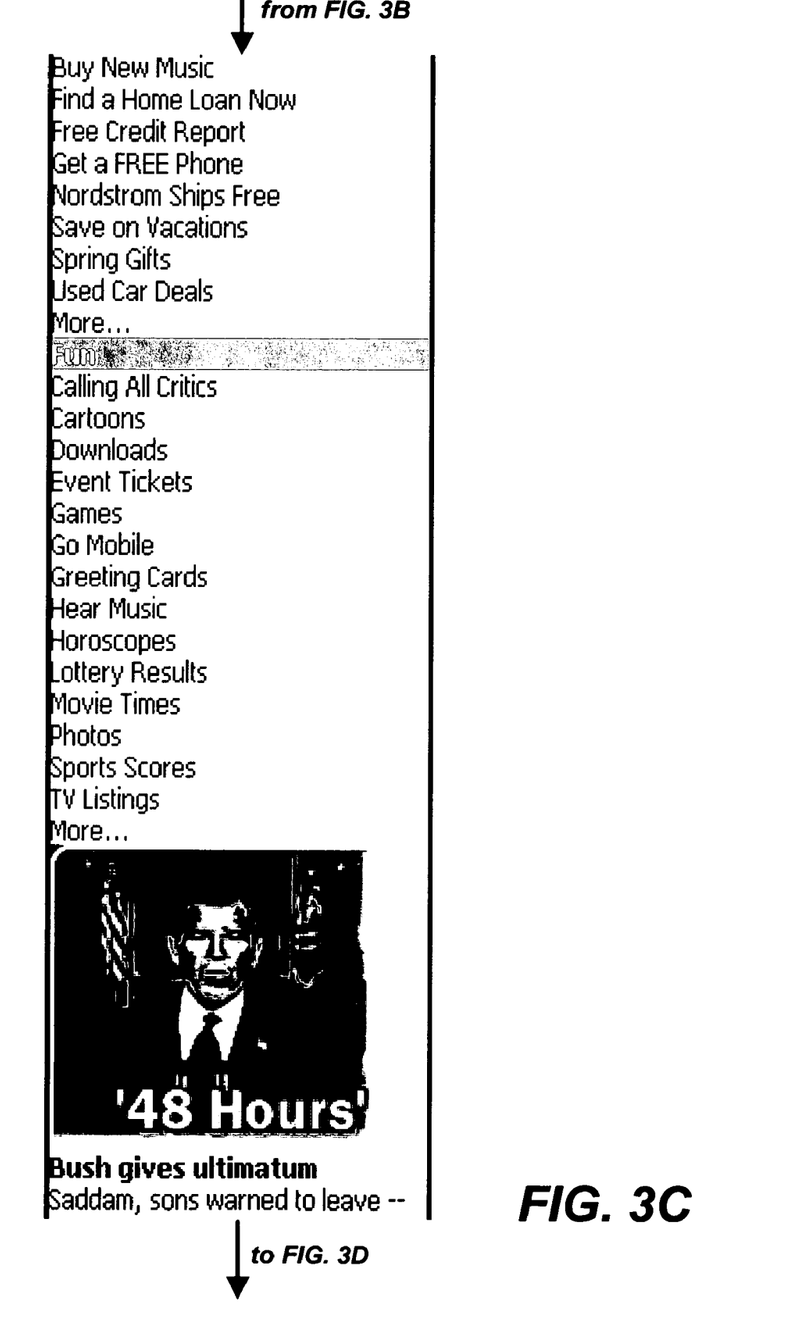
Figure 3D:
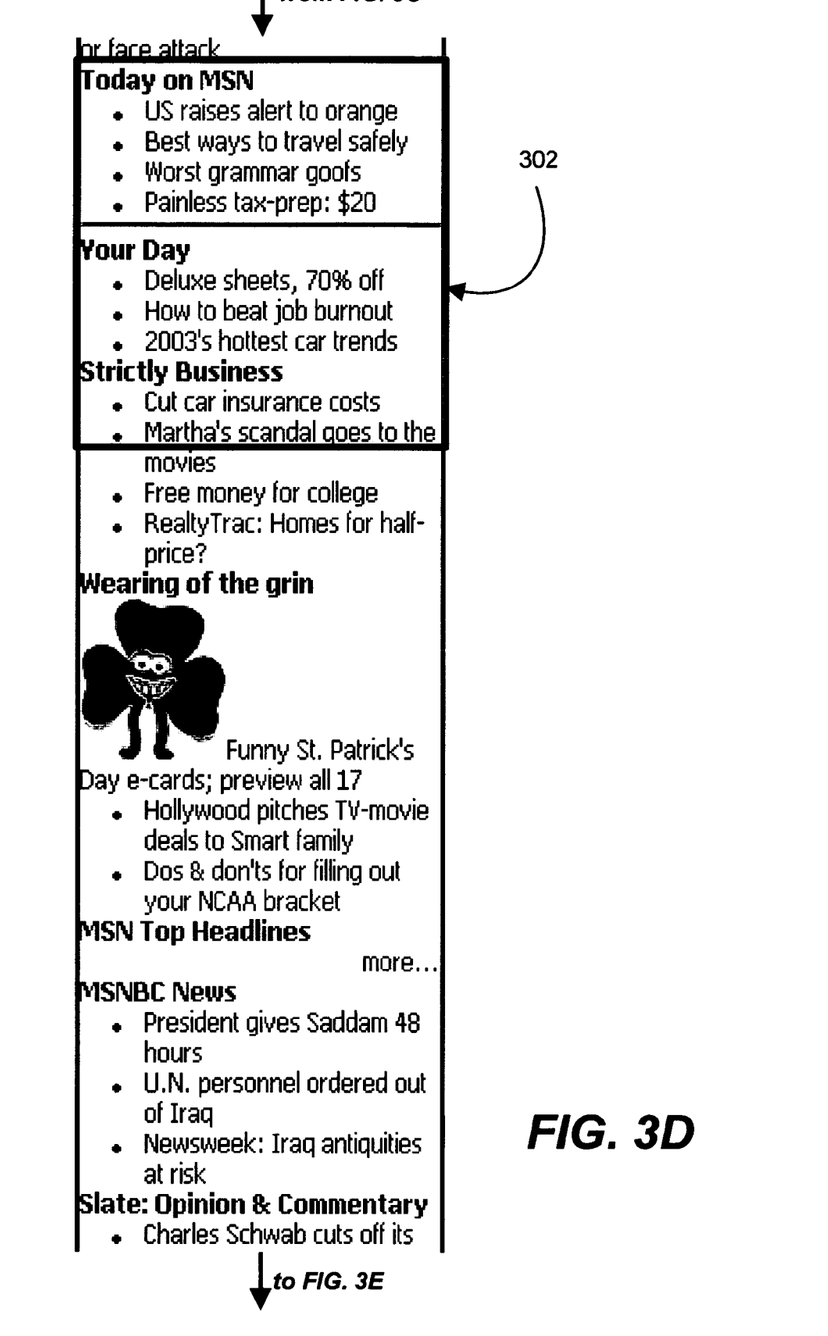
Figure 3E:
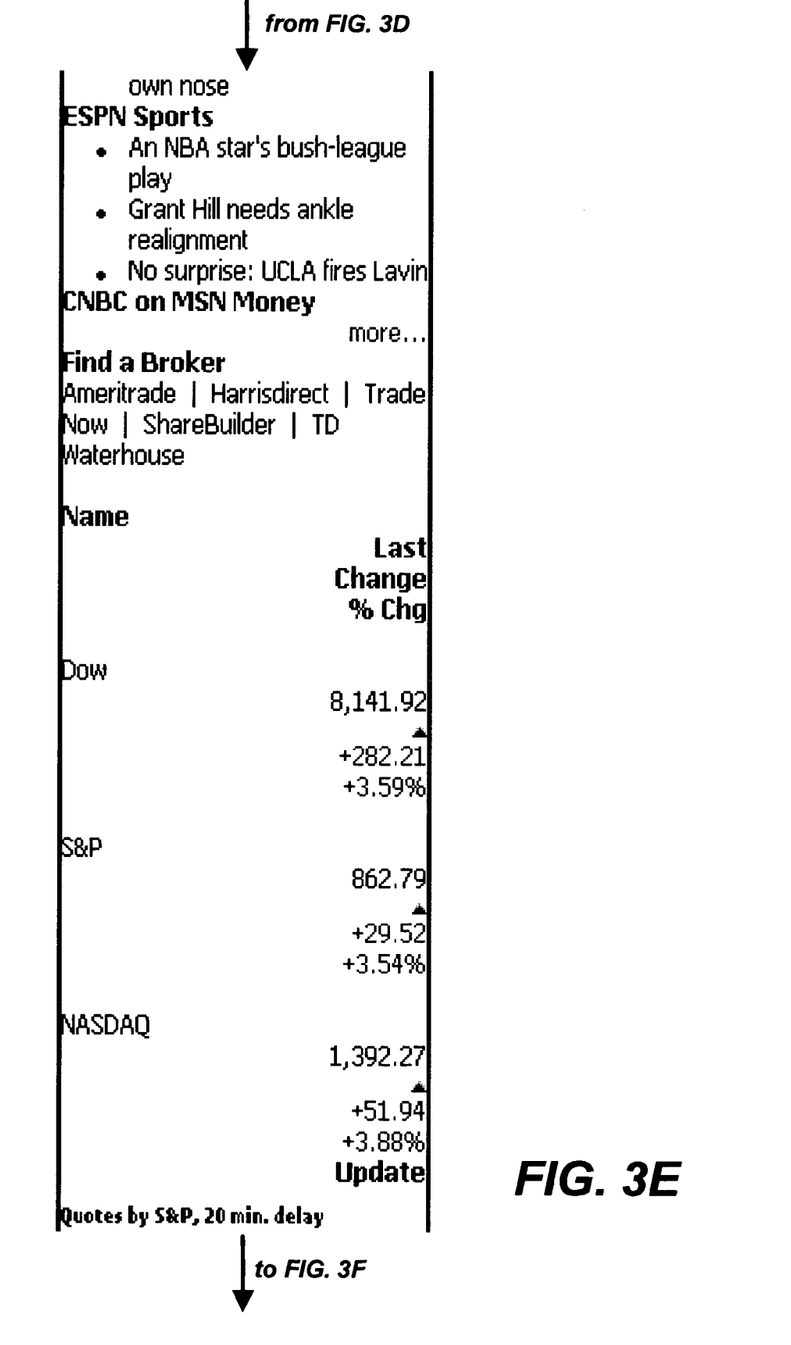
Figure 3F:
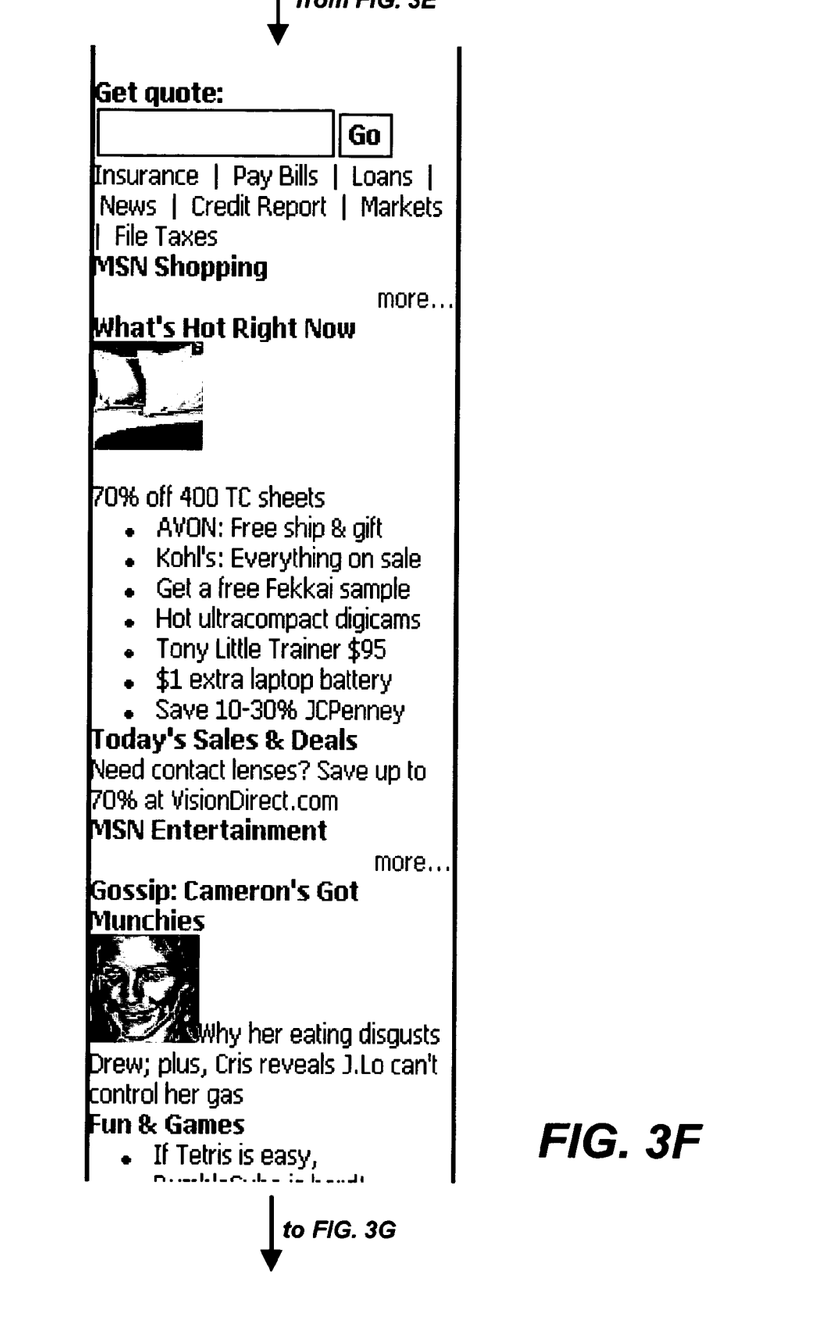
Figure 3G:
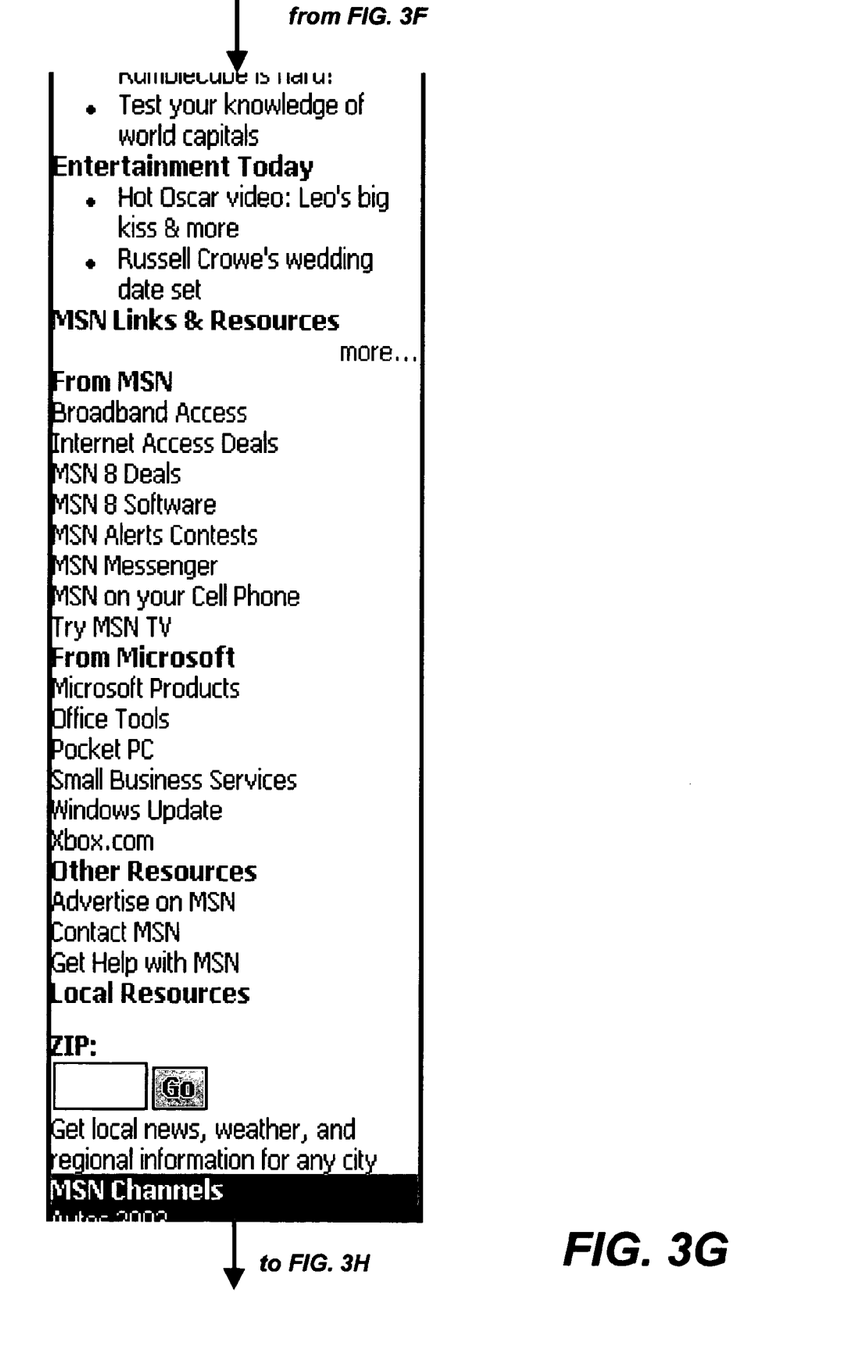
Figure 3H:
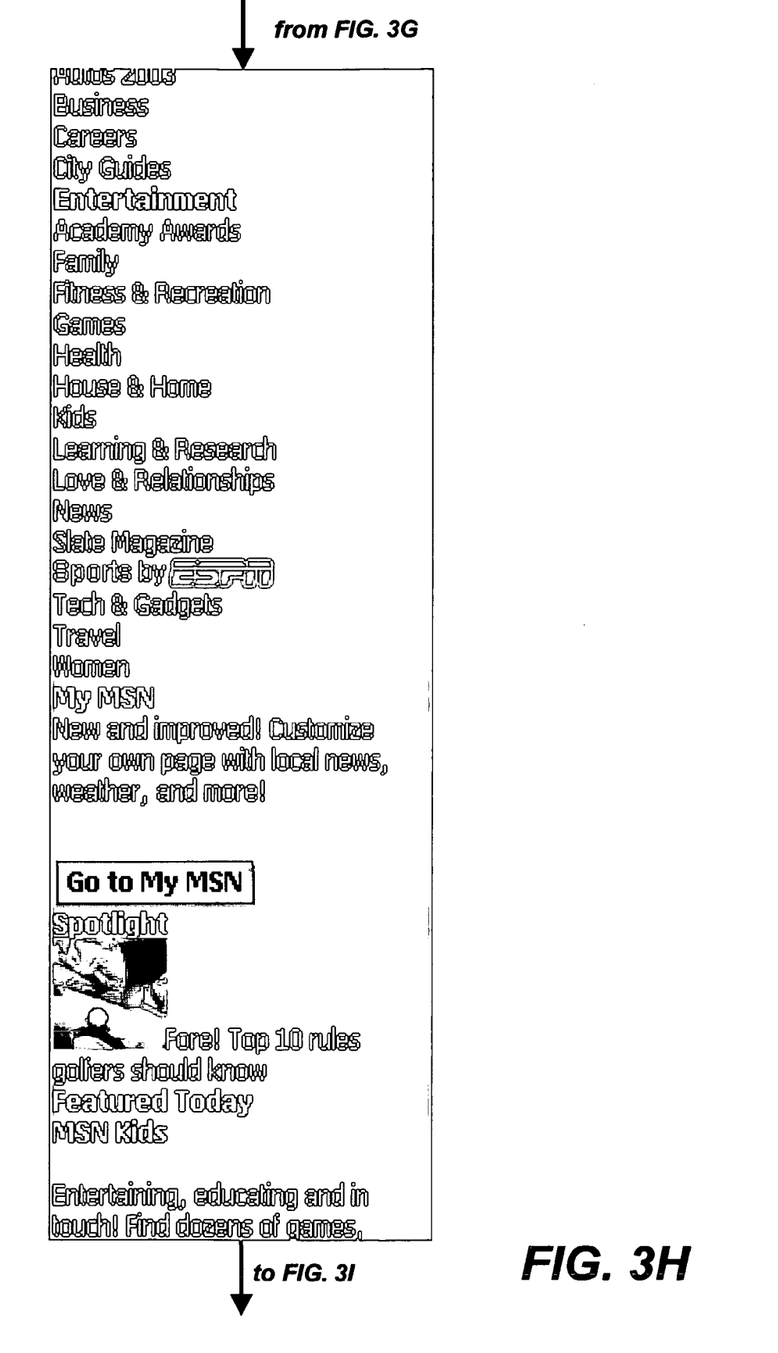
Figure 3I:
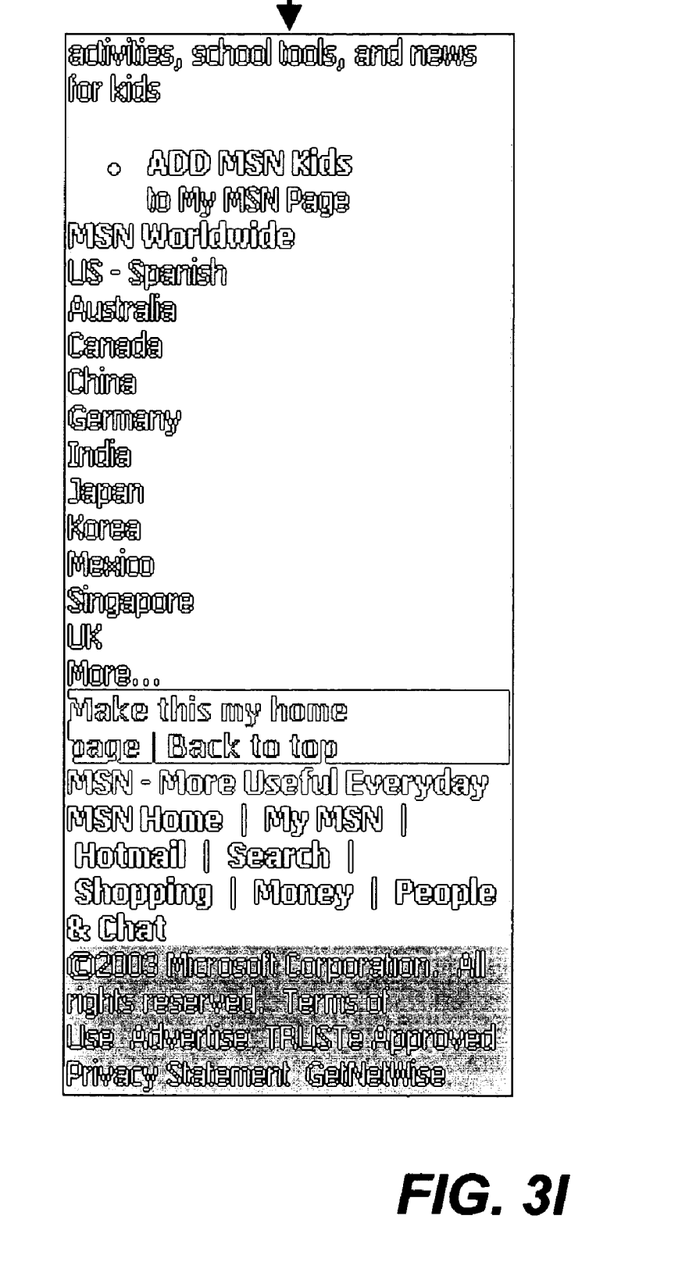

Turning to FIG. 2, there is shown a mobile telephone and computing device 200 having a display 204. As described below, the device 200 includes browser software and is thus capable of presenting content including web pages and the like to users. Various buttons/keys are provided that allow a user to control the operation of the device 200, including a four-way navigation button 208 that detects left, right, up and down movements, and also detects a user's tapping action. Other buttons include a "Home" button 212 and a "Back" button 216. As can be readily appreciated, via the buttons the user can navigate among content such as provided in web pages.

In accordance with an aspect of the present invention and as generally represented in FIG. 2, in one implementation, when a user requests a page, the page is internally rearranged so that it can be presented as a single column through which the user need only scroll vertically to view the page contents. FIGS. 3A-3I show how one example page has been rearranged into a single column 300 of content, with the box labeled 302 (in FIG. 3D) representing the area of the page currently being viewed on the display 204 of FIG. 2. As the user scrolls vertically, this viewing box 302 logically moves up and down the page image 300. As can be readily appreciated, the single column layout of the present invention eliminates the need to scroll horizontally to read content, thereby solving a fundamental problem with browsing on mobile devices today, namely presenting web content on the small screen of a mobile device in a way that users can easily use and understand.

Figure 4:
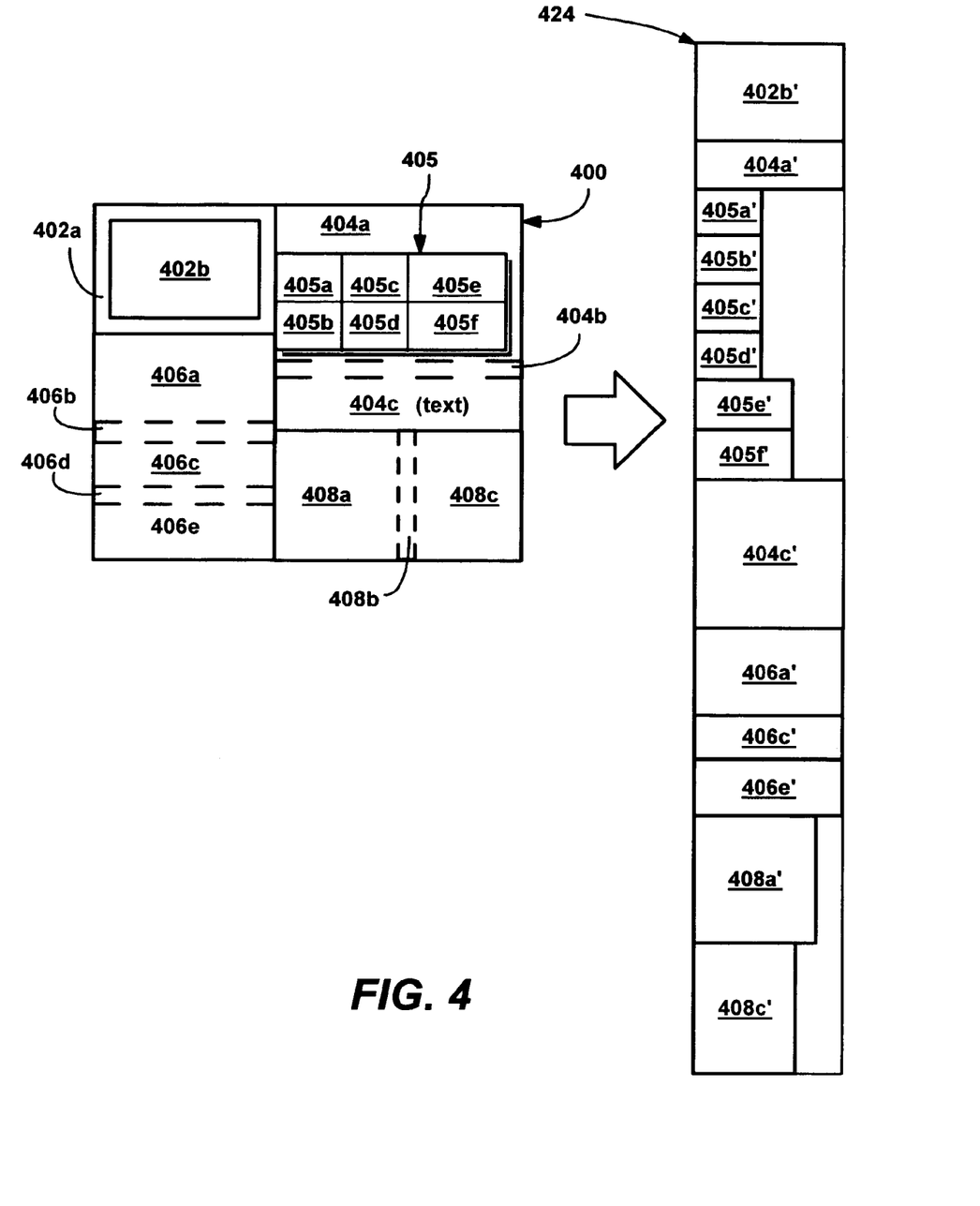
FIG. 4 is a representation of content designed for presentation in columns and rows having been rearranged for display in a single column in accordance with an aspect of the present invention.

To accomplish the rearranging of the initial page, the present invention provides a number of mechanisms, as generally described with reference to FIGS. 4 and 5. In FIG. 4, there is shown a representation of a page 400 as it would be rendered in a conventional browser, possibly with vertical and horizontal scrolling as needed to view the entire contents, depending on the size of the window in which the page is rendered. Also shown in FIG. 4 is a page 424 rearranged in accordance with an aspect of the present invention.

In general, and as described below, the present invention modifies the initial page's source code (e.g., originally in a HyperText Markup Language (HTML) or a Cascading Style Sheets (CSS) format) such that when interpreted for final rendering, the contents of the page are in a single column. As also described below, this is accomplished by rendering table cells as block elements to ensure that one cell appears per line, wrapping text content so the width of a line of text does not exceed the width of the screen, and eliminating decorative and spacer images that are used for layout purposes, but that do not contain any relevant content the user needs to see, read, or click. Any specified widths or margins are varied as necessary, and any remaining images are re-sized to fit to the width of the screen.

Figure 5:
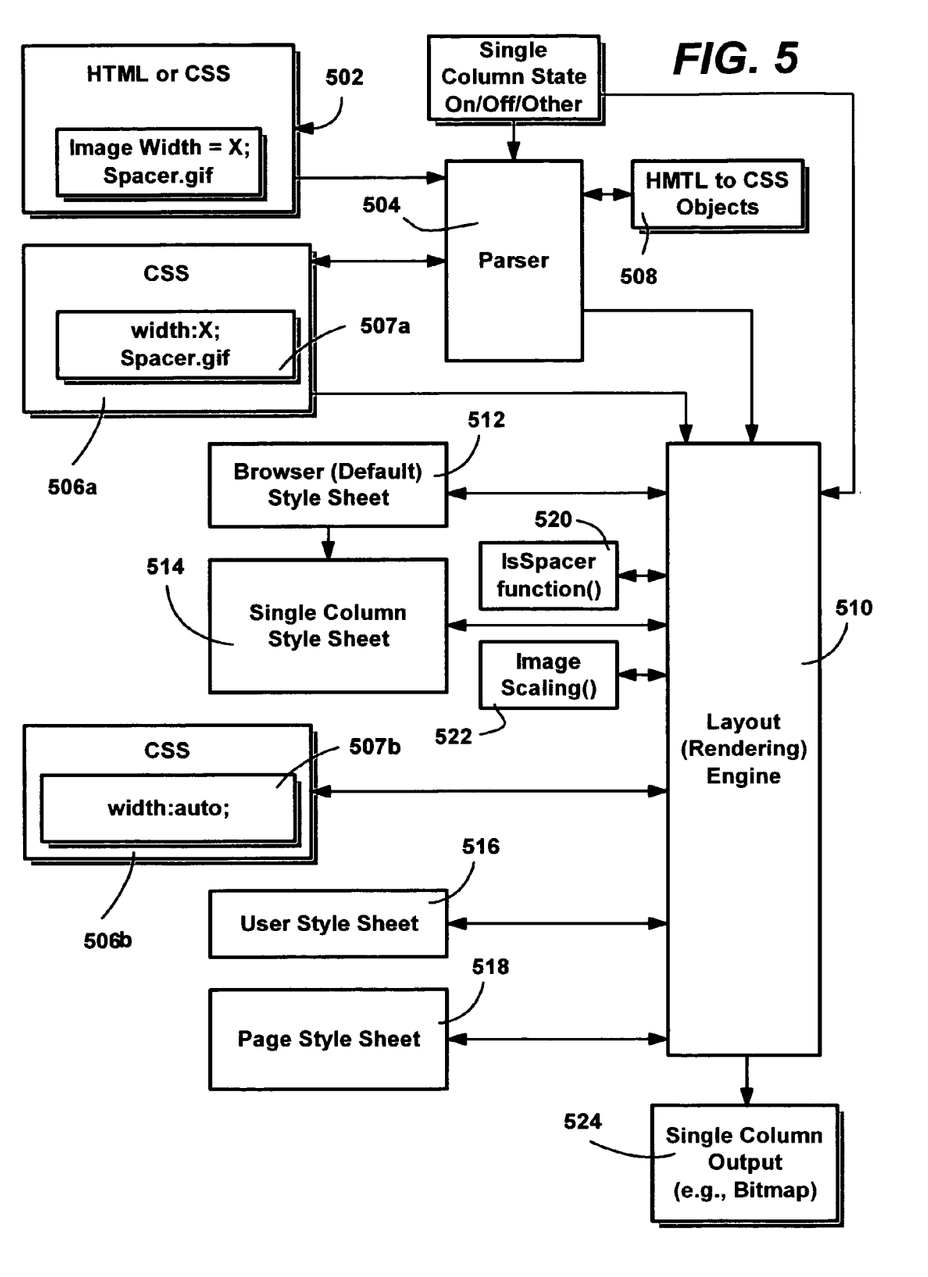
FIG. 5 is a block diagram representing example components for rearranging content for display in a single column in accordance with an aspect of the present invention.

FIG. 5 is a representation of example components that perform these operations on received content 502. If the received content 502 is HTML, attributes and parts of the HTML that have CSS equivalents are converted to CSS during a parsing phase, e.g., by a parser 504 to CSS 506a. Note that the conversion is not necessary when the received content is already in CSS format.

In general, the conversion operates by finding a CSS equivalent for the HTML, where appropriate. To this end, the parser 504 invokes a suitable CSS equivalent table object from a set of such objects 508 based on the HTML, which, based on the HTML attribute or attributes for example, returns appropriately formatted equivalent CSS. For example, an HTML-specified table border of one pixel is converted to its CSS equivalent:

Table Border=1 becomes Table Style="border=1px"

Note for example, that the TABLE tag remains (HTML) while the attribute "Border=1" is converted to the CSS property "border=1px." This resides in the HTML attribute, Style, which exists to hold CSS. The following table lists the CSS equivalents for HTML tags and their attributes:

| HTML Tag | Attribute | CSS Equivalent |
|---|---|---|
| FRAMESET | bordercolor = {color} | border-color: {color}; |
| FRAME | | border-color: inherit; |
| IMG | width = {n} | width: {n}; |
| | height = {n} | height: {n}; |
| | border = {n} | border: {n} solid; |
| | vspace = {n} | margin-top: {n}; margin-bottom: {n}; |
| | hspace = {n} | margin-left: {n}; margin-right: {n}; |
| | align = absbottom | vertical-align: text-bottom; |
| | align = absmiddle | vertical-align: middle; |
| | align = baseline | vertical-align: baseline; |
| | align = bottom | vertical-align: bottom; |
| | align = left | vertical-align: left; |
| | align = middle | vertical-align: middle; |
| | align = right | vertical-align: right; |
| | align = texttop | vertical-align: text-top; |
| | align = top | vertical-align: top; |
| INPUT (Button, Option) | align = absbottom | vertical-align: text-bottom; |
| | align = absmiddle | vertical-align: middle; |
| | align = baseline | vertical-align: baseline; |
| | align = bottom | vertical-align: bottom; |
| | align = left | vertical-align: left; |
| | align = middle | vertical-align: middle; |
| | align = right | vertical-align: right; |
| | align = texttop | vertical-align: text-top; |
| | align = top | vertical-align: top; |
| BASEFONT | color = {color} | color: {color}; |
| | face = {font} | font-family: {font}; |
| | size = {n} | font-size: {n}; |

-continued

| HTML Tag | Attribute | CSS Equivalent |
|---|---|---|
| FONT | color = {color} | color: {color}; |
| | face = {font} | font-family: {font}; |
| | size = {n} | font-size: {n}; |
| OL | type = 1 | list-style-type: decimal; |
| | type = a | list-style-type: lower-alpha; |
| | type = A | list-style-type: upper-alpha; |
| | type = i | list-style-type: lower-roman; |
| | type = I | list-style-type: upper-roman; |
| | type = {type} | list-style-type: {type}; |
| UL | type = 1 | list-style-type: decimal; |
| | type = a | list-style-type: lower-alpha; |
| | type = A | list-style-type: upper-alpha; |
| | type = i | list-style-type: lower-roman; |
| | type = I | list-style-type: upper-roman; |
| | type = {type} | list-style-type: {type}; |
| | type = plain | list-style-type: none; |
| LI | type = 1 | list-style-type: decimal; |
| | type = a | list-style-type: lower-alpha; |
| | type = A | list-style-type: upper-alpha; |
| | type = i | list-style-type: lower-roman; |
| | type = I | list-style-type: upper-roman; |
| | type = {type} | list-style-type: {type}; |
| OBJECT | width = {n} | width: {n}; |
| | height = {n} | height: {n}; |
| | align = absbottom | vertical-align: text-bottom; |
| | align = absmiddle | vertical-align: middle; |
| | align = baseline | vertical-align: baseline; |
| | align = bottom | vertical-align: bottom; |
| | align = left | vertical-align: left; |
| | align = middle | vertical-align: middle; |
| | align = right | vertical-align: right; |
| | align = texttop | vertical-align: text-top; |
| | align = top | vertical-align: top; |
| HR | size = {n} | if ({size} == 1) border-bottom: none; else if ({size} > 2) height: {size} px; |
| | width = {n} | width: {n}; |
| BODY | link = {color} | a { color: {color} }; |
| | vlink = {color} | a:visited { color: {color} }; |
| | alink = {color} | a:active { color: {color} }; |
| | bgcolor = {color} | background-color: {color}; |
| | leftmargin = {n} | margin-left: {n}; |
| | rightmargin = {n} | margin-right: {n}; |
| | topmargin = {n} | margin-top: {n}; margin-bottom: {n}; |
| | text = {color} | color: {color}; |
| | background = {url} | background-image: url( {url} ); |
| | nowrap | white-space: nowrap; |
| TABLE | | color: {inherit from body} |
| | border = {n} | border: {n}px solid; |
| | frame = above | border-top: {n} px solid; |
| | frame = hsides | border-top: {n} px solid; border-bottom: {n} px solid; |
| | frame = vsides | border-left: {n} px solid; border-right: {n} px solid; |
| | frame = box | border-top: {n} px solid; border-bottom: {n} px solid; border-left: {n} px solid; border-right: {n} px solid; |
| | frame = border | border-top: {n} px solid; border-bottom: {n} px solid; border-left: {n} px solid; border-right: {n} px solid; |
| | frame = below | border-bottom: {n} px solid; |
| | frame = lhs | border-left: {n} px solid; |
| | frame = rhs | border-right: {n} px solid; |
| | bordercolor = {color} | border-color: {color} |
| | bgcolor = {color} | background-color: {color} |
| | width = {n} | width: {n} |
| | height = {n} | height: {n} |
| | align = {align} | float: {align} |
| | background = {url} | background-image: url( {url} ); |
| TD, TH | | border: 1px solid; color: {inherit from body} |
| | width = {n} | width: {n}; |
| | height = {n} | height: {n}; |

-continued

| HTML Tag | Attribute | CSS Equivalent |
|---|---|---|
| | parent::rules = rows | border-top: 1px solid; border-bottom: 1px solid; |
| | parent::rules = cols | border-left: 1px solid; border-right: 1xp solid; |
| | parent::rules = all | border-top: 1px solid; border-bottom: 1px solid; border-left: 1px solid; border-right: 1xp solid; |
| | bordercolor = {color} | border-color: {color} |
| | nowrap | white-space: nowrap; |
| | background = {url} | background-image: url( {url} ); |
| | bgcolor = {color} | background-color: {color}; |
| | valign = {align} | vertical-align: {align} |
| | align = {align} | text-align: {align} |
| TR, TD | bgcolor = {color} | background-color: {color}; |
| | valign = {align} | vertical-align; {align} |
| | align = {align} | text-align: {align} |
| CAPTION | align = {align} | text-align: {align} |
| BR | clear = {clear} | clear: {clear} |
| DIV, Hn, P | align = {align} | text-align: {align} |

Once any needed CSS conversion is performed, the CSS 506a is interpreted by the layout engine 510 for rendering. In general, CSS is arranged as one or more columns having rows of data, resulting in cells of text (including links) and images. As is known, for purposes of formatting content for display, style sheets cascade, and are thus applied in order, beginning with a browser default style sheet 512. Following application of the browser default style sheet 512, which may reformat the source CSS (to an extent) to apply browser default settings, the content is rearranged into a single column, beginning with application of a single column style sheet 514.

In accordance with an aspect of the present invention, the single column style sheet 514 applies rules to change some of the layout attributes in the CSS as needed to present the content in a single column, and in a way that tends to optimize its presentation. As a result, the modified CSS changes multiple columns, table cells, and so forth into a single stacked column of content, such as in FIGS. 3A-3I.

In one implementation, the following rules are applied by the single column style sheet 514 to make the layout changes:

```
/*
- Render tables and table cells as blocks with no
padding/border/margins and disable explicit widths & heights.
- Render other table elements as block.
- Reduce horizontal margins (img hspace).
- Re-enable horizontal margins on a few elements
*/
table, td, th, caption { display:block !important;
padding:0px !important;
border:none !important;
margin:0px !important;
width:auto !important;
height:auto !important }
tr, tfoot, thead, tbody { display:inline !important }
body { margin-left:2px !important;
margin-right:2px !important }
body * { margin-left:0px !important;
margin-right:0px !important }
blockquote { margin-left:15px !important;
margin-right:15px !important }
ol, ul, dir, menu, dd { margin-left:30px !important }
```

Note that the use of the "!important" instruction prevents subsequent style sheets, including any user style sheet 516 and/or page style sheet 518, from overriding these layout changes.

As can be seen, the single column style sheet first renders only one td (table data) per row, which is achieved using CSS by indicating that td is a block level element. This preserves the blocks on the page and thus preserves the context of the block, (although any context that a user might obtain from the horizontal arrangement of blocks tends to be lost).

Any padding, border and margins are initially removed, and any content-specified heights and widths are instead set for automatic scaling. In the example of FIG. 5, the specified image width (of X) in the CSS source content 507a has been changed to "auto" in the CSS content 507b. Any rows, footers, headers and body content are further arranged to be displayed inline.

FIG. 4 shows part of the logical result of these revised rendering instructions, wherein blocks that would be vertically and horizontally positioned when displayed in a conventional way are instead displayed only vertically. Note that in FIG. 4, the border (represented by the perimeter 402a) has been removed such that only the content of block 402b will be presented.

To further accommodate viewing, any exterior left and right margins in the body are set to some number of pixels (e.g., 2px in the above example) on either side of the screen, via the body rule, (body {margin-left:2px !important; margin-right:2px important}). This removes unnecessary space lost to large borders and the like, but also ensures that there is a small margin so that content does not extend to the extreme ends of the displayed block. The body* rule is for every other tag within the body, and does not allow any margins for those tags, thereby giving even more horizontal space in the block for scaling the image.

A Blockquote is used to indent text, and any Blockquote attributes appearing in the CSS content are changed from a default (typically thirty pixels) or larger-specified value to fifteen pixels. Some horizontal indentation thus occurs, but the indentation is less than would otherwise be present. List items (ol, ul, dir, menu, dd) and the like, which also typically have a relatively large indentation (e.g., sixty pixels), likewise have their indentation reduced, to thirty pixels in this example.

Another way in which the single column presentation of the content is enhanced is via content wrapping. For example, text can wrap to fit within the column, and therefore need not be radically scaled down to fit within the column width. FIG. 4 shows an example of such a feature, where text in block 404c in the initial page layout 400 is wrapped in the single column page layout 424, thereby narrowing and lengthening the resultant block 404c'. Note however that some scaling of text or other wrapped content is still possible, such as for relatively large text.

In accordance with an aspect of the present invention, certain images are removed to facilitate viewing. More particularly, often many images in a page are transparent spacer images, or decorative images that have little utility in the new single column layout. Further, spacer images and the like can be confusing, because, for example, vertical gaps would potentially appear in the single column layout, and the user would need to know to continue to scroll over them. Such vertical gaps would also require additional, unnecessary scrolling. Unneeded images are removed according to the following rules, which may be applied by calling an IsSpacer function() 520 (FIG. 5):

> Cell background images can (and in one implementation will) be removed.
>
> Any image that is not greater than some size, e.g., 15px (high, wide or both) will not be included in the resulting single column view. This ensures that even the smaller icons on some mobile optimized pages (e.g., hotmail via msn mobile) remain on the page while spacer images are removed.
>
> However, images that are wrapped in anchor tags, or have image maps, will be retained regardless of size.

In general, the IsSpacer function() 520 analyzes the CSS and applies these rules to remove cell background images and relatively small images. It should be noted that other rules are feasible for detecting spacer images and the like. For example, the name of the file and/or image title commonly used for inserting spacer images (e.g., spacer.gif) can be detected from the CSS source content. Also capable of detection is whether the image is a solid color or transparent. Analysis of the content around an image in question also can be analyzed to determine if the image is needed or not.

FIG. 5 shows an example in which the "spacer.gif" image has been removed between the source content 507*a* and content 507*b*, (whether detected by its title or because it had a size of less than fifteen pixels, or detected in some other manner). FIG. 4 shows how removal of unneeded images may result in a better layout, wherein, for example, spacer images 404*b*, 406*b*, 406*d* and 408*b* are removed and thus do not appear in the single column page layout 424.

The blocks are also re-scaled as necessary prior to presentation, e.g., by calling an image scaling function 522, such that the entire width of each block fits the display screen. One way to scale content is described in U.S. patent application Ser. No. 10/404,209 entitled "System and Method for Scaling Images to Fit a Screen on a Mobile Device According to a Non-Linear Scale Factor," assigned to the assignee of the present invention and hereby incorporated by reference.

As a result of the present invention, the output from the rendering engine 510 is a single column (e.g., a bitmap) that eliminates the need for horizontal scrolling for (almost all) content. Typically, only vertical scrolling is necessary, as indicated by the only vertical scroll indicator 220 (FIG. 2) which shows a current amount of scroll. Note that if a particular image is so wide that it cannot be compressed without distorting the image beyond where that image is recognizable, horizontal scrolling can be introduced if necessary, but for example only while that particular image is being shown on the display. It is also feasible to rotate some images so that they would be fully viewable only via by vertical scrolling.

Other aspects and benefits are provided with the present invention, including user-configurability. One option the user has is to selectively turn on or off the single-column presentation mode. Another option would be to provide a third state, e.g., in which single column is on, but an image would not be scaled beyond a certain amount. In other words, horizontal scrolling might apply for a given image based on a user's preference settings. Other states may include disabling the !important instruction within the single column style sheet as desired for one or more layout attributes, whereby subsequent style sheets would be able to override those particular attributes.

Note that the single column style sheet is a component that can be loaded. Thus a different style sheet can be inserted instead of the above-described single column style sheet. For example, a third party developer that has an alternative style sheet can supply it as an alternative for users, or as something users can add to the single column style sheet. Also, a style sheet that assists in debugging and/or developing single column content for viewing can be used by testers and designers.

It is also equivalent to arrange a page such that instead of a single column that facilitates only vertical scrolling, a single row that facilitates horizontal scrolling can be provided. For example a single row of content may be provided, e.g., by aligning the blocks in a row instead of stacking them, possibly jumping from block to block with left-to-right scrolling commands rather than smoothly scrolling.

For page designers, the Mobile Optimized meta-tag may be used with the present invention. More particularly, it is feasible for a page designer to insert a "mobile-optimized" tag around content to arrange content in accordance with the designer's instructions, including in a single-column layout. If a page contains this meta-tag, the page will layout with the "normal" view (the single column layout model will turn off for such a page), and thus it would be up to the page designer to arrange the page as a single column. Without such a tag, the browser code will continue rendering the page in whatever view the user has currently selected, be it a conventional viewing mode, a single column viewing mode, or some other viewing mode.

As can be seen from the foregoing detailed description, there is provided a method and system for improved viewing and navigation of content that is particularly useful on devices having small display areas. The method and system enable viewers to rapidly and intuitively locate desired content within a structured document such as a web page, generally using only vertical scrolling. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device, a method comprising:
   arranging content to appear in a single column when rendered for display on a device, including vertically-stacking at least two blocks of content that were originally designed for appearing horizontally relative to one another; and
   rendering the single column for display on a device.

2. The method of claim 1 wherein arranging the content to appear in the single column comprises converting HTML to CSS.

3. The method of claim 1 wherein a set of style sheets is processed to render the content, and wherein arranging the content to appear in the single column comprises including a style sheet in the set of style sheets.

4. The method of claim 3 wherein the style sheet includes information that when processed causes tables and table cells to be rendered as blocks.

5. The method of claim 4 wherein the style sheet includes information that when processed causes the blocks to have no padding.

6. The method of claim 4 wherein the style sheet includes information that when processed causes the blocks to have no border.

7. The method of claim 4 wherein the style sheet includes information that when processed causes the blocks to have no margins.

8. The method of claim 4 wherein the style sheet includes information that when processed causes any block having an explicitly-specified height value to instead have an automatically scaled height.

9. The method of claim 4 wherein the style sheet includes information that when processed causes any block having an explicitly-specified width value instead to have an automatically scaled width.

10. The method of claim 4 wherein the style sheet includes information that when processed causes at least one table element to be rendered as a block level element.

11. The method of claim 4 wherein the style sheet includes information that when processed reduces a horizontal margin value specified in the content.

12. The method of claim 4 wherein the style sheet includes information that when processed provides a predetermined horizontal margin value for at least part of the content.

13. The method of claim 4 wherein the style sheet includes information that when processed eliminates a horizontal margin value for at least part of the content.

14. The method of claim 4 wherein the style sheet includes information that when processed reduces a horizontal indentation value specified in the content.

15. The method of claim 1 further comprising, detecting a particular image in the content, and removing the particular image from the content arranged to appear in the single column.

16. The method of claim 15 wherein detecting a particular image in the content comprises analyzing the content for an image having a dimension less than a certain size.

17. The method of claim 16 wherein detecting a particular image in the content comprises analyzing the content for a spacer image.

18. The method of claim 17 wherein analyzing the content for a spacer image comprises looking for an image title or file name.

19. The method of claim 1 further comprising providing vertical scrolling to view the contents of the horizontal column.

20. The method of claim 1 further comprising, resizing at least one block to correspond to a width of a display screen on the device.

21. A computer-readable medium having computer-executable instructions which when executed perform the method of claim 1.

22. In a computing device, a method comprising:
receiving content that is designed to have at least two horizontal columns when rendered; and
processing a style sheet to modify the content, the style sheet including information that when processed modifies the content into a plurality of stacked blocks such that when rendered the modified content appears in a single horizontal column.

23. The method of claim 22 further comprising, scaling at least one of the stacked blocks to fit within the width of a display screen.

24. The method of claim 22 further comprising, displaying the single horizontal column, and providing vertical scrolling to view the contents of the horizontal column.

25. The method of claim 22 wherein the content is received as HTML, and further comprising converting HTML to CSS.

26. The method of claim 22 wherein processing the style sheet to modify the content comprises modifying tables and table cells to be rendered as the blocks.

27. The method of claim 22 wherein processing the style sheet to modify the content comprises removing or reducing data corresponding to at least one of the set containing: padding data, border data and margin data.

28. The method of claim 22 wherein processing the style sheet to modify the content comprises modifying an explicitly-specified width or height value.

29. The method of claim 22 wherein processing the style sheet to modify the content comprises modifying a table element to be rendered as a block level element.

30. The method of claim 22 wherein processing the style sheet to modify the content comprises reducing a horizontal margin value.

31. The method of claim 22 wherein processing the style sheet to modify the content comprises reducing a horizontal indentation value.

32. The method of claim 22 further comprising, removing a spacer image from content such that the spacer image is not in the modified content.

33. A computer-readable medium having computer-executable instructions which when executed perform the method of claim 22.

* * * * *